United States Patent [19]

Screptock et al.

[11] Patent Number: 5,520,821

[45] Date of Patent: May 28, 1996

[54] APPARATUS FOR PREVENTING OR ELIMINATING ZEBRA MUSSEL INFESTATION OF A DOMESTIC WATER SUPPLY

[76] Inventors: Andrew D. Screptock; Sylvia J. Screptock, both of 133 Eagle Point Dr., Rossford, Ohio 43460

[21] Appl. No.: 434,649

[22] Filed: May 4, 1995

[51] Int. Cl.⁶ .................................................. C02F 1/76
[52] U.S. Cl. .......................... 210/744; 210/754; 210/764; 210/104; 210/136; 210/198.1
[58] Field of Search .................................. 210/754, 749, 210/764, 104, 136, 198.1, 739, 744

[56] References Cited

U.S. PATENT DOCUMENTS

| | | | |
|---|---|---|---|
| 5,008,075 | 4/1991 | Rufolo | 422/6 |
| 5,040,487 | 8/1991 | Bollyky et al. | 119/4 |
| 5,192,451 | 3/1993 | Gill | 210/755 |
| 5,209,934 | 5/1993 | Ekis, Jr. et al. | 424/661 |
| 5,229,125 | 7/1993 | Patarcity et al. | 424/409 |
| 5,253,954 | 10/1993 | Landsberger | 405/127 |
| 5,256,310 | 10/1993 | Brooks | 210/747 |
| 5,368,748 | 11/1994 | Sanderson | 210/748 |

OTHER PUBLICATIONS

"Zebra Mussels: a 1992 Great Lakes Overview", the Great Lakes Sea Grant Network, 1992.

*Primary Examiner*—Neil McCarthy

*Attorney, Agent, or Firm*—David C. Purdue; John C. Purdue

[57] ABSTRACT

A chlorinator in combination with a domestic water system is disclosed. The water system has a water inlet under the surface of an outdoor body of water, a pressurized storage tank, a water pump, an inlet pipe operably connecting the water pump and the water inlet, a detector/controller operable to sense the water level in the storage tank and to energize and de-energize the water pump as required to maintain the water level in the tank within predetermined limits, and an outlet line through which water can flow from the tank to the water system. The water pump is operably connected to discharge water into the interior of the storage tank. The chlorinator has a tank for storing dilute aqueous chlorine, a chlorine pump operably connected to withdraw aqueous chlorine from the aqueous chlorine tank, and to deliver the aqueous chlorine to the interior of the water inlet pipe near the water inlet. The capacities of the water pump and of the chlorine pump are such that, at a given chlorine concentration in the chlorine storage tank, the chlorine concentration of a mixture in the inlet pipe of effluent from the chlorine pump and water from the outdoor body pumped through the water inlet by the water pump is sufficiently high to be lethal to zebra mussels, but not sufficiently high that the mixture has an objectionable chlorine odor. The chlorine pump is operably connected so that it is energized whenever the water pump is energized, and de-energized whenever the water pump is de-energized.

5 Claims, 3 Drawing Sheets

5,520,821

APPARATUS FOR PREVENTING OR ELIMINATING ZEBRA MUSSEL INFESTATION OF A DOMESTIC WATER SUPPLY

FIELD OF THE INVENTION

This invention is directed to apparatus which is a chlorinator in combination with a domestic water system which has a water inlet under the surface of an outdoor body of water, and, more particularly, under the surface of an outdoor body of water that is inhabited by zebra mussels. The purpose of the chlorinator is to eliminate zebra mussels, if present, from the water system and to prevent: the infestation of the water system by zebra mussels.

BACKGROUND OF INVENTION

According to a recent publication (*Zebra Mussels: a 1992 Great Lakes Overview*, the Great Lakes Sea Grant Network, 1992):

- zebra mussels were discovered in the Great Lakes in 1988;
- since their discover, they have been sighted in all of the great lakes and in the Hudson, Susquehanna, Ohio, Illinois, Tennessee and Mississippi river systems.
- scraping, once or twice a month, is the recommended method for removal from docks and piers, where a large buildup should be avoided because their waste products can cause damage;
- mussels can attach to outdrives of boats that remain in infested water, covering or entering water intakes, clogging cooling systems and damaging cooling system parts, and causing excessive drivetrain wear by attaching to props and shafts;
- mussels can attach to private and municipal water intakes, can even invade water systems and, in extreme cases, can completely clog household plumbing systems; and
- chlorination, at the point of raw water intake, has proved to effective in controlling zebra mussels.

Zebra mussel infestation of domestic water supply systems poses problems not only in terms of blockage of intake pipes but, more significantly, blockage of piping within the domestic water system requiring, eventually, the replacement of all of the domestic plumbing.

THE PRIOR ART

U.S. Pat. No. 5,008,075, Apr. 16, 1991, "Rufolo", discloses apparatus for introducing a chemical into an underwater intake pipe. The apparatus includes a first feed pipe through which the chemical flows from a pump house to a second feed pipe which is attached to an intake pipe adjacent an intake pipe opening, and a plurality of releasing valves through which the chemical flows from the second feed pipe into the interior of the intake pipe.

U.S. Pat. No. 5,368,748, Nov. 29, 1994, "Sanderson", discloses apparatus and a method for treating water magnetically, "thereby reducing the requirements and cost of water-system maintenance and the quantity of toxic chemical treatments released to the environment."

U.S. Pat. No. 5,256,310, Oct. 26, 1993, "Brooks", discloses the use of chlorine dioxide for the treatment of water at an offshore water intake facility. The use of a generator on a portable vessel for the generation of the chlorine dioxide is disclosed.

U.S. Pat. No. 5,253,954, Oct. 19, 1993, "Landsberger", discloses the use a plurality of alternate water intake pipes for a water treatment plant or a power plant. When one of the intake pipes becomes clogged by zebra mussels, water flow through that pipe is discontinued "which causes starvation of the mussels due to suffocation."

U.S. Pat. No. 5,229,125, Jul. 20, 1993, "Patarcity et al.", discloses a "polymer resin-molluscicidal composite from which valves, linings, coating and encapsulators can be produced.

U.S. Pat. No. 5,209,934, May 11, 1993, "Ekis et al." discloses the control of zebra mussels by treating waters in which they grow with a chlorine solution and a bromide salt capable of releasing bromide ions to the chlorine solution.

U.S. Pat. No. 5,192,451, Mar. 6, 1993, "Gill", discloses controlling zebra mussels in ship ballast tanks by treating ballast water with a water-soluble dialkyl diallyl quaternary ammonium polymer.

U.S. Pat. No. 5,040,487, Aug. 20, 1991, "Bollyky et al.", discloses the use of ozone to control zebra mussels in a (raw) water system or in the intake water of a power plant cooling system or of an industrial process water system.

BRIEF DESCRIPTION OF THE INSTANT INVENTION

The instant invention is a chlorinator in combination with a domestic water system. The water system has a water inlet under the surface of an outdoor body of water, a pressurized storage tank, a water pump, an inlet pipe operably connecting the water pump and the water inlet, a detector/controller operable to sense the water level in the storage tank and to energize and de-energize the water pump as required to maintain the water level in the tank within predetermined limits, and an outlet line through which water can flow from the tank to the water system. The water pump is operably connected to discharge water into the interior of the storage tank. The chlorinator has a tank for storing dilute aqueous chlorine, a chlorine pump operably connected to withdraw aqueous chlorine from the aqueous chlorine tank, and to deliver the aqueous chlorine to the interior of the water inlet pipe near the water inlet. The capacities of the water pump and of the chlorine pump are such that, at a given chlorine concentration in the chlorine storage tank, the chlorine concentration of a mixture in the inlet pipe of effluent from the chlorine pump and water from the outdoor body pumped through the water inlet by the water pump is sufficiently high to be lethal to zebra mussels, but not sufficiently high that the mixture has an objectionable chlorine odor. The chlorine, pump is operably connected so that it is energized whenever the water pump is energized, and de-energized whenever the water pump is de-energized.

DESCRIPTION OF THE PREFERRED EMBODIMENT

Figure 1:
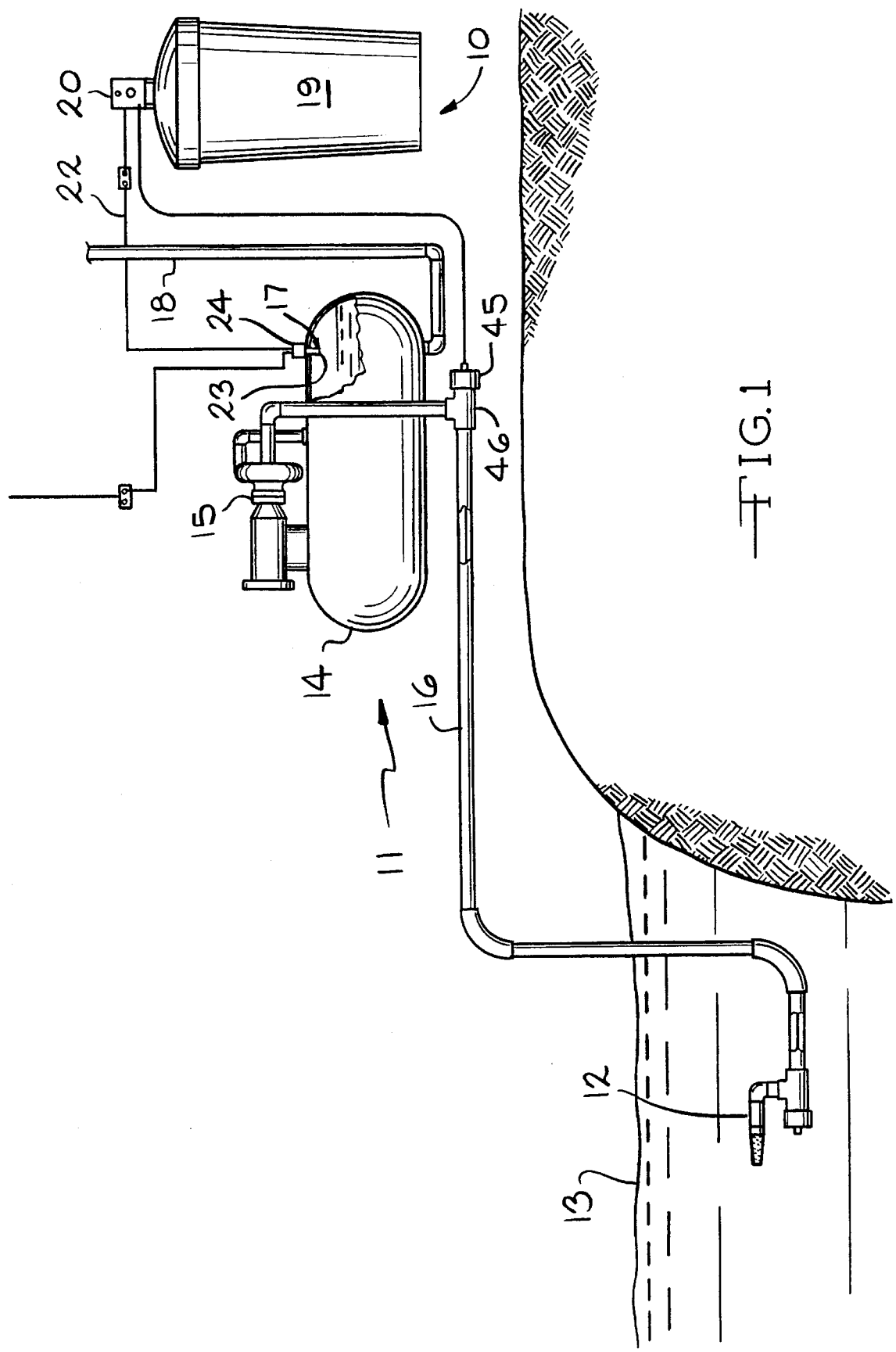
FIG. 1 of the attached drawings is a somewhat schematic diagram showing a combination according to the invention of a chlorinator with a domestic water system.

A chlorinator indicated generally at 10 is shown in FIG. 1 in combination with a domestic water system, which is indicated generally at 11. The water system 11 has a water inlet 12 under the surface of an outdoor body of water, which is designated 13, a storage tank 14, a water pump 15, an inlet pipe 16 which operably connects the water pump 15 and the water inlet 12, a detector/controller, preferably in the form of a pressure switch indicated generally at 17 which is operable to control the water level in the storage tank and to energize and de-energize the water pump as required to maintain the water level in the tank within predetermined limits, and an outlet line 18 through which water can flow from the tank 14 to the water system (not illustrated). The water pump 15 is operably connected to discharge water into the interior of the storage tank 14. The chlorinator 10 has a tank 19 for storing dilute aqueous chlorine, a chlorine pump 20 operably connected to withdraw aqueous chlorine from the tank 19, and to deliver the aqueous chlorine to the interior of the water inlet pipe 16 near the water inlet 12. The capacities of the water pump 15 and of the chlorine pump 20 are such that, at a given chlorine concentration in the chlorine storage tank 19, the chlorine concentration of a mixture in the inlet pipe 16 of effluent from the chlorine pump 20 and water from the outdoor body 13 pumped through the water inlet 12 by the water pump 15 is sufficiently high to be lethal to zebra mussels, i.e., contains at least about 0.2 parts per million of chlorine, but is not sufficiently high that the mixture has an objectionable chlorine odor, i.e., contains less than about 0.6 parts per million of chlorine. The chlorine pump 20 is operably connected by a line 22 to receive power whenever the water level in the tank 14 is low, a diaphragm 23 of the detector/controller 17 closes a switch 24, energizing the pump 15 and energizing the pump 20. As soon as the water in the tank 14 reaches a predetermined level, the diaphragm 23 opens the switch 24, de-energizing the pump 15 and preventing the energization of the pump 20. Accordingly, the pump 20 is energized whenever the water pump 15 is energized, and is de-energized whenever the water pump 15 is de-energized.

Figure 2:
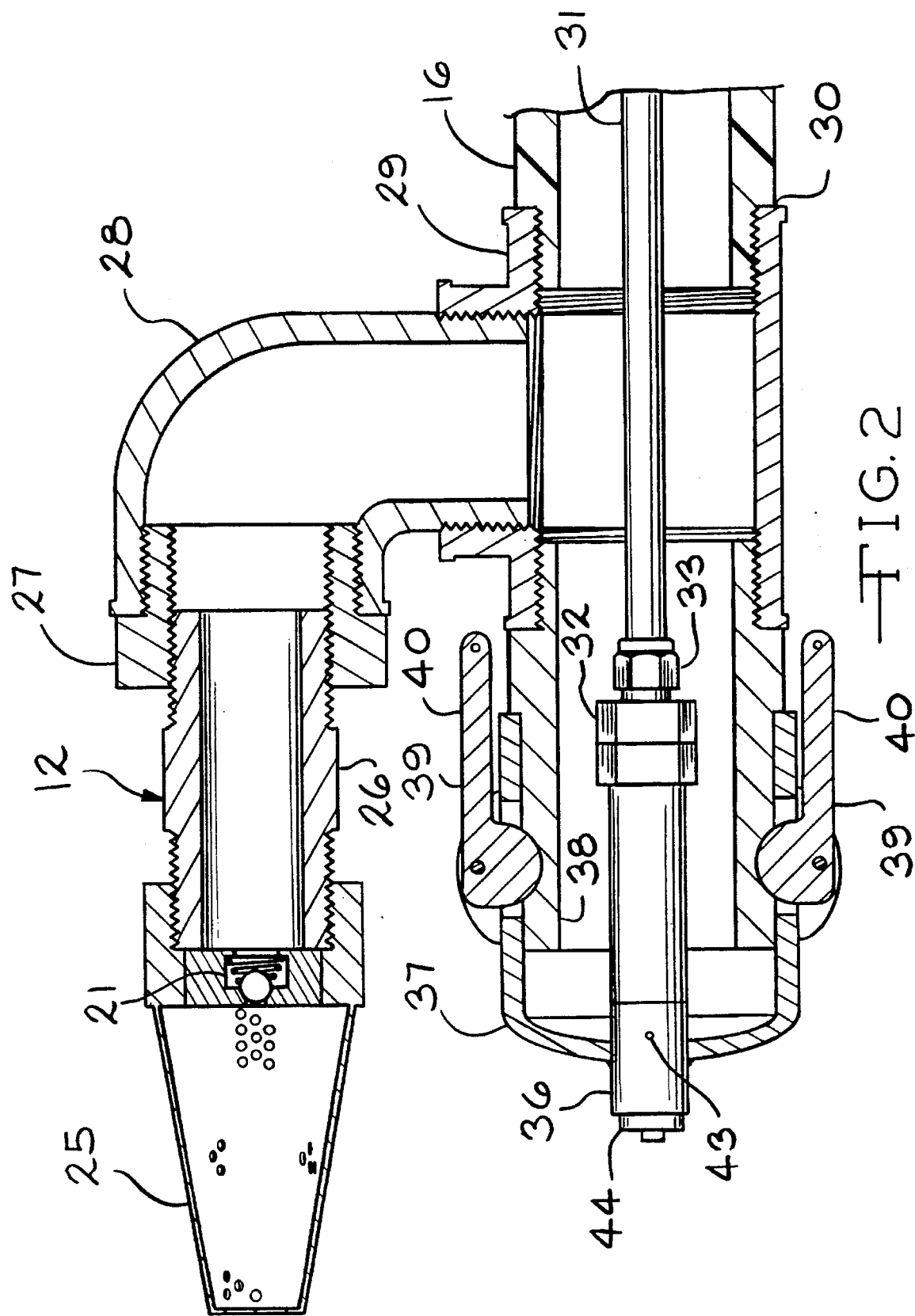
FIG. 2 is a vertical sectional view showing a water inlet and an outlet for dilute aqueous chlorine, both of which are parts of the apparatus of FIG. 1.
Figure 3:
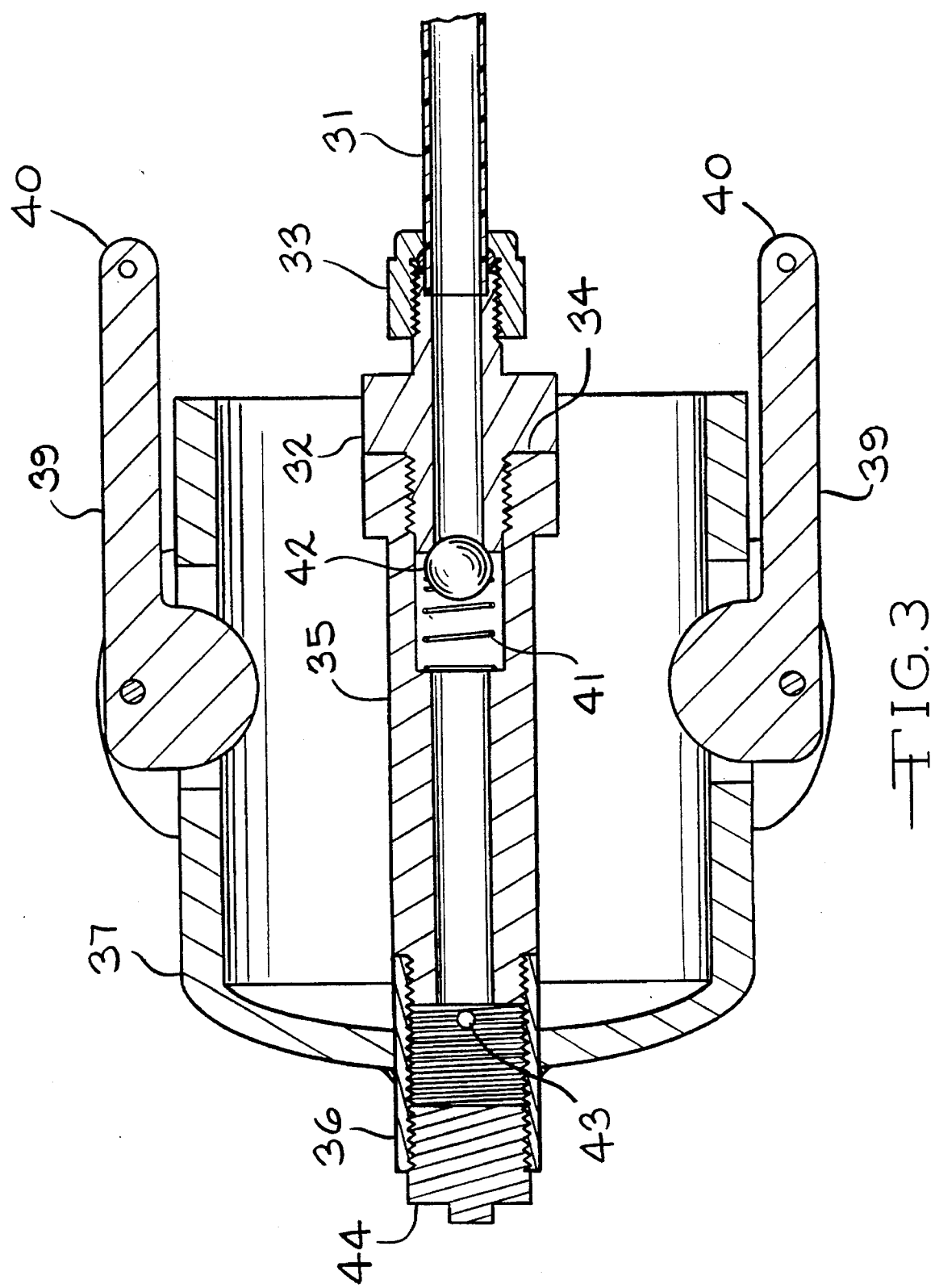
FIG. 3 is an enlarged view in vertical section showing further details of the outlet for dilute aqueous chlorine of FIGS. 1 and 2.

Referring to FIGS. 2 and 3, the water inlet 12 is made up of an inlet tip 25 with a check valve 21 operable to prevent the flow of water from the inlet back into the body of water 13, a sleeve 26, a reducer 27 and an elbow 28. One end of the elbow 28 is threaded into a leg of a T 29, while the reducer 27 is threaded into the other end of the elbow 28. One end of the sleeve 26 is threaded into the reducer 27, while the other end is threaded into the inlet tip 25. Accordingly, the entire inlet 12 can be removed from the T 29, and disassembled to whatever extent may be necessary for inspection and servicing, if necessary.

The T 29 is threaded onto an inlet end 30 of the water inlet pipe 16 (see FIG. 2). A chlorine pipe 31 extends through the inlet end 30 of the pipe 16 and through the T 29 to a check valve indicated generally at 32. As shown in FIG. 1, one end of the chlorine pipe 31 is operably associated with the pump 20 to receive aqueous chlorine therefrom; the other end, as just described and as shown in FIGS. 2 and 3, extends to the check valve 32, to which it is coupled for example, by a compression nut, as indicated at 33. One end, designated 34, of a chlorine discharge tip 35 is threaded onto the exterior of the check valve 32, while the other end is threaded into a chlorine outlet indicated generally at 36, which is a part of a quick disconnect cap 37 for a quick disconnect fitting 38 that is threaded into the T 29 (FIG. 2). The cap 37 is attached to the fitting 38 by two quick disconnect members 39 which, in the positions shown in FIGS. 2 and 3, lock the cap 37 to the fitting 38. When handles 40 of the members 39 are rotated away from the fitting 38, the cap 37 can be rotated so that it is advanced to the left (see FIG. 3) out of threaded engagement with the chlorine discharge tip 35.

When the water pump 15 and the chlorine pump 20 are not operating, a spring 41 seats a ball 42 inside the check valve 32, preventing the flow of water through the check valve 32 and into the chlorine pipe 31 as well as the flow of chlorine through the check valve to the discharge tip 35. When the pumps 15 and 20 are energized, aqueous chlorine is pumped through the pipe 31 and the check valve 32, forcing the ball 42 from its seat, and flowing through the interior of the chlorine discharge tip 35 and openings 43 (one of which is shown in FIGS. 2 and 3) to the exterior of the discharge tip 35, where it mixes with water entering the system through the water inlet 12, and the mixture is pumped into the tank 14. A closed plug 44 prevents the escape of aqueous chlorine from the end of the chlorine outlet 36.

Referring to FIG. 1, the chlorine pipe 31 connects the chlorine pump 20 to a fitting 45, with which it is engaged, extending through a T 46 and the inlet pipe 16 to the check valve 32 as shown in FIGS. 2 and 3.

The apparatus shown in FIGS. 1–3 and described above with reference thereto has been installed in the water system of a private home on an island in the St. Lawrence River, Ontario, Canada, and operated for about 10 weeks. Fifty water samples taken from the system during this period of operation were analyzed for chlorine content, which was found to range from a low of 0.25 parts per million to a high of 0.50 parts per million, mean value 0.28 parts per million. The concentration of chlorine in the tank 19 required to achieve the desired chlorine level in the system was estimated from manufacturer's data concerning the performance of the pumps 15 and 20, and aqueous chlorine of the estimated concentration was charged to the tank 19. Water was drained from the tank 14 through a valve (not illustrated), and the pumps 15 and 20 were operated for a period of about 10 minutes. The chlorine content of the water in the tank 14 was then checked, using a commercially available kit, and was found, on this occasion, to be 0.25 parts per million, which was deemed to be satisfactory. Had it been either too high or to low, however, it would have been a simple matter to adjust the pump to decrease or increase the flow of aqueous chlorine, as needed. Alternatively, the adjustment in concentration could be achieved by adding water or chlorine to lower or raise the chlorine content in the tank 19, as required.

It will be appreciated that various changes and modifications can be made from the specific details of the invention as shown in the attached drawings and described with reference thereto without departing from the spirit and scope of the invention as defined in the attached claims. For example, chemicals other than aqueous chlorine which are non-toxic and effective for killing zebra mussels can be charged to the tank 10 and mixed with intake water in the manner described above.

I claim:

1. A chlorinator in combination with a domestic water system, said water system having a water inlet under the surface of an outdoor body of water, a pressurized storage tank, a water pump operably connected to discharge water into the interior of said storage tank, an inlet pipe operably connecting said water pump and said water inlet, a detector/controller operable to control the water level in said storage tank and to energize and de-energize said water pump as required to maintain the water level in said tank within predetermined limits, and an outlet line through which water can flow from said tank to the water system, and said chlorinator having a tank for storing dilute aqueous chlorine, a chlorine pump operably connected to withdraw aqueous chlorine from said aqueous chlorine tank, and to deliver the aqueous chlorine to the interior of said water inlet pipe near said water inlet, the capacities of said water pump and of said chlorine pump being such that, at a given chlorine concentration in said chlorine storage tank, the chlorine concentration of a mixture in said inlet pipe of effluent from said chlorine pump and water from said outdoor body pumped through said water inlet by said water pump is sufficiently high to be lethal to zebra mussels, but not sufficiently high that the mixture has an objectionable chlorine odor, said chlorine pump being operably connected so that it is energized whenever said water pump is energized, and de-energized whenever said water pump is de-energized.

2. A chlorinator-domestic water system combination as claimed in claim 1, wherein there is a conduit inside said water inlet pipe which extends from a discharge end near said water inlet to a location where said water inlet pipe is above the surface of the body of water, wherein said chlorine pump is operably connected to deliver aqueous chlorine to the interior of said conduit at the end thereof which is above the surface of the body of water, and wherein the apparatus is effective to prevent aqueous chlorine delivered by said chlorine pump from mixing with water being chlorinated until after the aqueous chlorine leaves the discharge end of said conduit.

3. A chlorinator-domestic water system combination as claimed in claim 2, which additionally includes a check valve which is operable to prevent flow into the discharge end of said conduit but not operable to prevent flow from the discharge end of said conduit, and wherein the apparatus is effective to prevent aqueous chlorine delivered by said chlorine pump from mixing with water being chlorinated until after the aqueous chlorine leaves said check valve.

4. A chemical dispensing apparatus in combination with a domestic water system, said water system having a water inlet under the surface of an outdoor body of water, a pressurized storage tank, a water pump operably connected to discharge water into the interior of said storage tank, an inlet pipe operably connecting said water pump and said water inlet, a detector/controller operable to control the water level in said storage tank and to energize and de-energize said water pump as required to maintain the water level in said tank within predetermined limits, and an outlet line through which water can flow from said tank to the water system, and said apparatus having a tank for storing an aqueous chemical which is toxic to zebra mussels, a chemical pump operably connected to withdraw the aqueous chemical from said aqueous chemical tank, and to deliver the aqueous chemical to the interior of said water inlet pipe near said water inlet, the capacities of said water pump and of said chemical pump being such that, at a given chemical concentration in said chemical storage tank, the chemical concentration of a mixture in said inlet pipe of effluent from said chemical pump and water from said outdoor body pumped through said water inlet by said water pump is sufficiently high to be lethal to zebra mussels, but not sufficiently high that the mixture has an objectionable human toxicity, said chemical pump being operably connected so that it is energized whenever said water pump is energized, and de-energized whenever said water pump is de-energized.

5. A method for preventing or eliminating zebra mussel infestation of a domestic water system including a chlorinator having a tank for storing dilute aqueous chlorine, a water inlet pump for pumping water from a water intake inlet under the surface of an outdoor body of water through an intake pipe, as needed, to a water storage tank to maintain a water level therein within predetermined limits, said method comprising the steps of detecting a low water level in said water storage tank;

energizing said water inlet pump upon detection of said low water level in said water storage tank, and simultaneously energizing a chlorine pump to deliver aqueous chlorine from said aqueous chlorine tank to the interior of said intake pipe only when water is being pumped to the storage tank and discharging the aqueous chlorine within said pipe, adjacent to the intake inlet;

mixing the aqueous chlorine with the intake water to establish a chlorine concentration in the mixture which is sufficiently high to be lethal to zebra mussels, but not sufficiently high that the mixture has an objectionable chlorine odor; and preventing the discharge of aqueous chlorine from the intake pipe to the body of water.

\* \* \* \* \*

UNITED STATES PATENT AND TRADEMARK OFFICE
CERTIFICATE OF CORRECTION

PATENT NO. : 5,520,821
DATED : May 28, 1996
INVENTOR(S) : Screptock et al.

It is certified that error appears in the above-indentified patent and that said Letters Patent is hereby corrected as shown below:

Column 1, Line 24 should read:
since their discovery, they have been sighted in all of the Signed and Sealed this Seventh Day of January, 1997

Attest:

BRUCE LEHMAN

Attesting Officer

Commissioner of Patents and Trademarks